United States Patent [19]

Freeman, Jr.

[11] Patent Number: 4,737,911

[45] Date of Patent: Apr. 12, 1988

[54] PROCESS FOR ELECTRONICALLY MAINTAINING FINANCIAL RECORDS, ESPECIALLY FOR CHECKBOOK BALANCING AND RECTIFICATION

[75] Inventor: John W. Freeman, Jr., Houston, Tex.

[73] Assignee: Nelson H. Shapiro, Rockville, Md.; a part interest

[21] Appl. No.: 742,411

[22] Filed: Jun. 7, 1985

[51] Int. Cl.⁴ .............................................. G06F 15/30
[52] U.S. Cl. .................................... 364/406; 364/715; 364/408; 235/379
[58] Field of Search ............... 364/401, 406, 408, 415, 364/705, 715; 235/379, 380, 381

[56] References Cited

U.S. PATENT DOCUMENTS

| | | | |
|---|---|---|---|
| 3,920,979 | 11/1975 | Kilby et al. | 235/168 |
| 3,946,202 | 3/1976 | Taniguchi et al. | 235/380 |
| 4,053,735 | 10/1977 | Foudous | 235/61.9 |
| 4,177,518 | 12/1979 | Olander, Jr. et al. | 364/710 |
| 4,222,109 | 9/1980 | Siwula | 364/715 |
| 4,277,837 | 7/1981 | Stuckert | 364/900 |
| 4,308,588 | 12/1981 | Siwula | 364/715 |
| 4,341,951 | 7/1982 | Benton | 364/406 |
| 4,454,414 | 6/1984 | Benton | 364/406 |
| 4,460,965 | 7/1984 | Tzehn et al. | 364/408 |
| 4,569,029 | 2/1986 | Hatta et al. | 364/406 |
| 4,587,409 | 5/1986 | Nishimura et al. | 235/380 |

FOREIGN PATENT DOCUMENTS 56-14369   2/1981   Japan .

*Primary Examiner*—Joseph Ruggiero
*Assistant Examiner*—Kimthanh T. Bui
*Attorney, Agent, or Firm*—Shapiro and Shapiro

[57] ABSTRACT

A process for maintaining financial records, such as checkbook balances, in which a checking account user employs a hand-held calculator to record the usual checkbook data electronically. The calculator is programmed to calculate and memorize a first running balance dependent upon numeric data entered by the user. A financial institution maintains a second running balance dependent upon the user's checks and deposits and periodically provides the user with a magnetic card on which the second running balance and other data have been recorded. The card is read by the user's calculator to balance the user's checkbook.

4 Claims, 1 Drawing Sheet

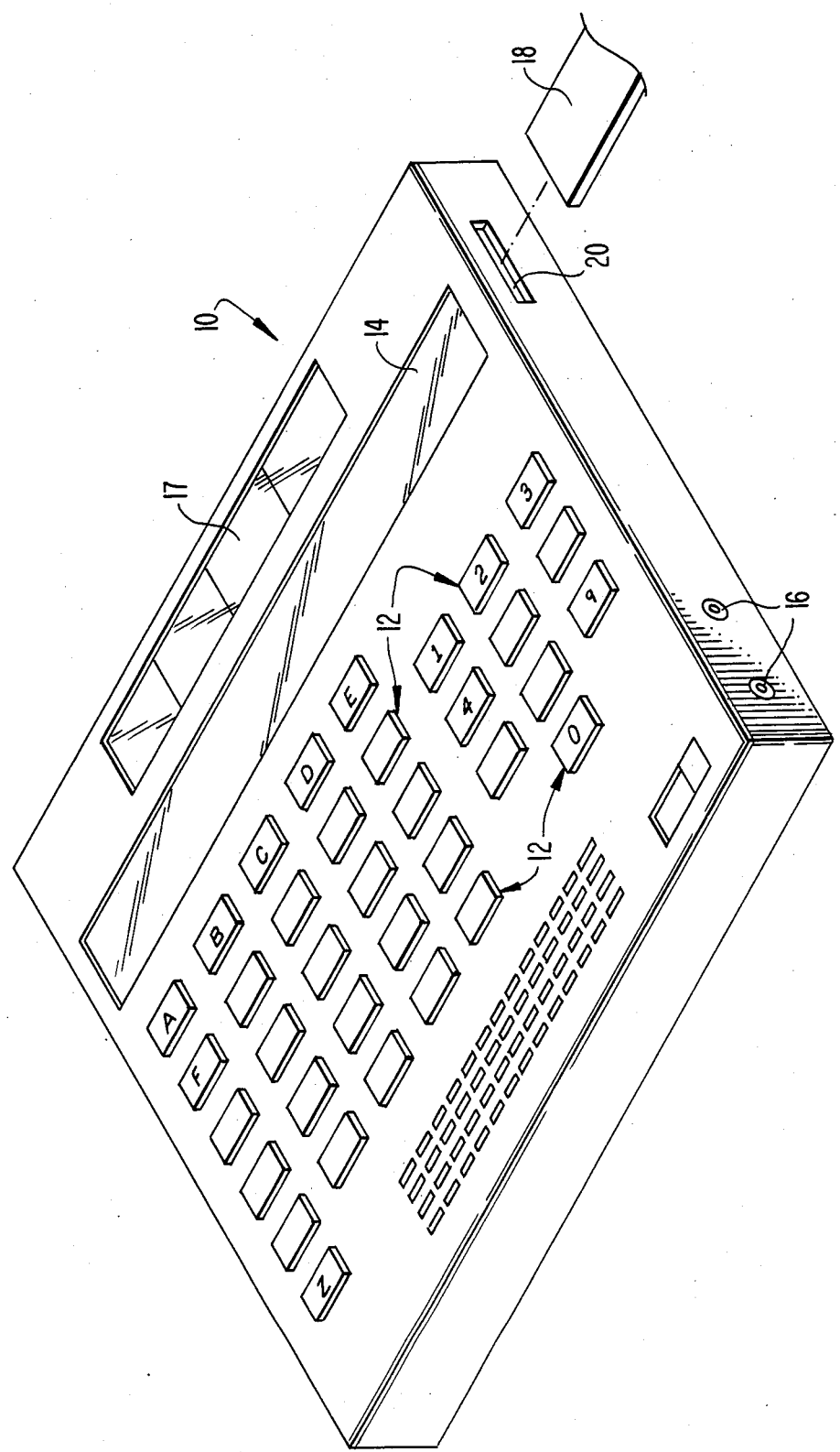

PROCESS FOR ELECTRONICALLY MAINTAINING FINANCIAL RECORDS, ESPECIALLY FOR CHECKBOOK BALANCING AND RECTIFICATION

BACKGROUND OF THE INVENTION

This invention relates to the maintenance of financial records and is more particularly concerned with a process for recording, balancing, and rectifying data normally maintained in a checkbook.

State-of-the-art technology exists for recording checkbook data electronically, and even for electronic check writing. See, for example, U.S. Pat. Nos. 4,222,109, issued Sept. 9, 1980; 4,308,588, issued Dec. 29, 1981; and 3,920,979, issued Nov. 18, 1975. Personal portable terminals for financial transactions are also known. See, for example, U.S. Pat. No. 4,277,837, issued July 7, 1981. It has also been proposed to substitute for a conventional passbook (that requires passbook printing machines) a "card" that is capable of providing the same functions of a passbook plus some features of an ordinary calculator. The "card" is coupled to a card reader of a separate processing unit to transfer data thereto. See Japanese Pat. No. 56-14369. However, despite the ready availability of sophisticated hardware and software for conducting a plethora of financial transactions, the ordinary task of monthly checkbook balancing and rectification remains inordinately difficult and tedious. In fact, the task of comparing a balance of checks and deposits as recorded on a bank statement with a checkbook balance is so burdensome that many users of checking accounts simply accept the bank statements as correct and ignore any discrepancies. The present invention provides a simple process for solving this problem.

BRIEF DESCRIPTION OF THE INVENTION

In a preferred embodiment of the invention, checkbook stubs are eliminated, and the handwritten data normally recorded therein is entered into a memory of a hand-held calculator. The calculator is pre-programmed to compute and record a first running balance from the data entered. Instead of sending the usual bank statements to checking account users, a bank or other financial institution responsible for disbursing and receiving funds corresponding to transactions entered in the hand-held calculator sends to the checking account user a machine-readable record, such as a magnetic card on which the usual bank statement information is recorded. The user inserts the card into the calculator, which is pre-programmed to compare the first balance in the calculator memory with a second balance on the card and to assist the user with the rectification of any discrepancies. The tedious task of balancing a checkbook and rectifying any differences between the checkbook balance and a bank statement balance is eliminated.

In one of its broader aspects, the invention is a process of maintaining financial records, which comprises providing a user with a unit having data entry means, memory means, and calculating means, entering into said memory means, via said data entry means, machine-readable data, including numeric data, concerning each of a plurality of financial transactions of the user, calculating, via said calculating means, and storing in said memory means a first running balance depending upon the totality of said numeric data, providing data, including numeric data, concerning said financial transactions to a remote financial institution, providing at said financial institution a machine-readable record of a second running balance dependent upon the totality of the numeric data provided to said financial institution, electronically comparing, from time to time, said first running balance in said memory means with said second running balance in said record, and displaying the results of said comparing.

BRIEF DESCRIPTION OF THE DRAWING

The invention will be further described in conjunction with the accompanying drawing, in which the single FIGURE is a perspective view illustrating, somewhat diagrammatically, a hand-held calculator and magnetic card employed therewith in accordance with the invention.

DETAILED DESCRIPTION OF THE PREFERRED EMBODIMENT

A preferred embodiment of a process in accordance with the invention will be described with reference to preferred apparatus for performing the process of the invention, particularly for the maintenance of checkbook financial records, but the invention has broader utility. In accordance with the invention, each user of a checking account is provided with a hand-held calculator, such as the unit 10 shown in the drawing. The calculator may have a set of alphanumeric keys 12 and a display 14 (such as an LCD display). Alphanumeric data normally entered on checkbook stubs to record check writing and bank deposit transactions is instead entered into the calculator via the keys 12, or alternatively via voice signals (a microphone input being indicated at 16). The hand-held calculator has sufficient memory to retain the entered data and the results of calculations to be described. The calculator is pre-programmed to record the data entered and to compute from the numeric data a running balance representing the net of check writing and bank deposit transactions. Information concerning the various transactions and the running balance can be called up by appropriate key strokes and displayed. The hand-held calculator has a self-contained power source, such as long-lasting or rechargeable batteries, or solar cells 17, and may also be energized by an AC to DC converter. The memory, which must have sufficient storage capacity as noted above, may be magnetic or semi-conductor, for example. The calculator has conventional hardware and software for processing and recording data digitally, as is well known in the art. In the preferred form, the calculator is also capable of reading data recorded magnetically on cards (so-called "magnetic cards"). One such card 18 and a slot 20 for receiving the same are illustrated in the drawing. Apparatus based upon the technology embodied in the Hewlett-Packard 71B programmable calculator with the 82400A Card Reader may be employed in the invention, although it will be apparent that the sophisticated computations of which this apparatus is capable are not required by the invention. Magnetic tape cassettes may also be employed as the memory of the calculator (and as a bank statement recording medium) for use with suitable recording and playback units, such as the Sharp EL 5500II provided with the CE-126P Printer/Cassette Interface and a cassette recorder.

In the preferred embodiment the responsible financial institution maintains records of the checks that clear and deposits that are made and periodically sends to the checking account user a magnetic card 18 on which has been recorded the same type of information that normally would be provided in a bank statement. A secret personal identification number (PIN) may be recorded on each magnetic card so that only the corresponding checking account user may have access to the recorded data.

To check the accuracy of the running balance held in memory in the hand-held calculator, the user inserts the magnetic card 18 into slot 20 of the calculator 10 and instructs the calculator (by appropriate key strokes) to read and process the data on the card. The calculator is pre-programmed to compare data on the card with data previously entered by the user. The check number may be employed as a sort parameter. The calculator displays any disagreement as to check amounts, checks not entered or not cashed, etc., subtracts any monthly service charge, makes any necessary corrections to the balance, and displays the corrected balance. These calculations can be completed within a few seconds. If desired, all of the data held in the memory of the calculator, including the results of any calculations, may be read out to a printer through a conventional output port. The following is a typical flow chart which may be employed to implement the process of the invention.

KEYBOARD ENTRY MODE

1. PRINT "PRESS 'K' FOR KEYBOARD ENTRY, 'M' FOR MAGNETIC STRIP ENTRY, OR 'R' TO REVIEW OR CORRECT ENTRIES"
   INPUT 'K'
   PRINT "ENTER 'C' FOR CHECKS OR 'D' FOR DEPOSITS"

INPUT 'C':

2. PRINT "ENTER CHECK NUMBER: LAST CHECK NUMBER WAS _____"
   INPUT CHECK NO.
   STORE CHECK NO.
   PRINT "ENTER PAYEE"
   INPUT PAYEE
   STORE PAYEE
   PRINT "ENTER AMOUNT"
   INPUT AMOUNT
   STORE AMOUNT
   SUBTRACT AMOUNT FROM CURRENT BALANCE
   PRINT "ENTER DATE"
   INPUT DATE
   STORE DATE
   PRINT "ENTER NOTES"
   INPUT NOTES
   STORE NOTES
   PRINT "ENTER 'T' IF TAX DEDUCTABLE OR OTHER LETTER FOR SPECIAL FLAGS"
   INPUT FLAG
   STORE FLAG
   PRINT "ENTER 'L' IF LAST CHECK"
   IF INPUT = 'L' THEN GOTO 1
   GOTO 2

INPUT 'D':

3. PRINT "ENTER DEPOSIT NUMBER: LAST DEPOSIT NUMBER WAS _____"
   INPUT DEPOSIT NO.
   STORE DEPOSIT NO.
   PRINT "ENTER AMOUNT"
   INPUT AMOUNT
   STORE AMOUNT
   PRINT "ENTER DATE"
   INPUT DATE
   STORE DATE
   PRINT "ENTER NOTES"
   INPUT NOTES
   STORE NOTES
   PRINT "ENTER FLAG"
   INPUT FLAG
   STORE FLAG
   GOTO 1

MAGNETIC STRIP ENTRY MODE

1. PRINT "PRESS 'K' FOR KEYBOARD ENTRY, 'M' FOR MAGNETIC STRIP ENTRY, OR 'R' TO REVIEW OR CORRECT ENTRIES"
   INPUT 'M'
   PRINT "INSERT MAGNETIC STRIP"
   INPUT DATA FROM MAGNETIC STRIP
   STORE DATA FROM MAGNETIC STRIP
   REM:DATA FROM MAGNETIC STRIP INCLUDES CLEARED CHECK NUMBERS, AMOUNTS, DATES AND SIMILAR INFORMATION ON DEPOSITS RECORDED BY THE BANK, SERVICE CHARGES AND THE CURRENT BALANCE. IT IS STORED AND LABELED AS DATA FROM THE BANK STATEMENT.
   PRINT "BANK STATEMENT LOADED: ENTER 'B' TO BALANCE"
   INPUT 'B'
   COMPARE BANK STATEMENT CHECK AND DEPOSIT AMOUNTS WITH KEYBOARD ENTERED AMOUNTS
   STORE DISCREPANCIES
   ADD DISCREPANCIES
   ADD UNCLEARED CHECKS
   SUBTRACT DISCREPANCIES AND UNCLEARED CHECKS FROM CURRENT KEYBOARD BALANCE TO GET TRIAL BALANCE
   COMPARE TRIAL BALANCE WITH BANK STATEMENT BALANCE
   STORE BALANCE DISCREPANCY
   IF BANK BALANCE>TRIAL BALANCE PRINT "BANK OVER $XX.XX"
   IF BANK BALANCE<TRIAL BALANCE PRINT "CHECKBOOK OVER $XX.XX"
   IF BALANCE DISCREPANCY=0 PRINT "PERFECT BALANCE"

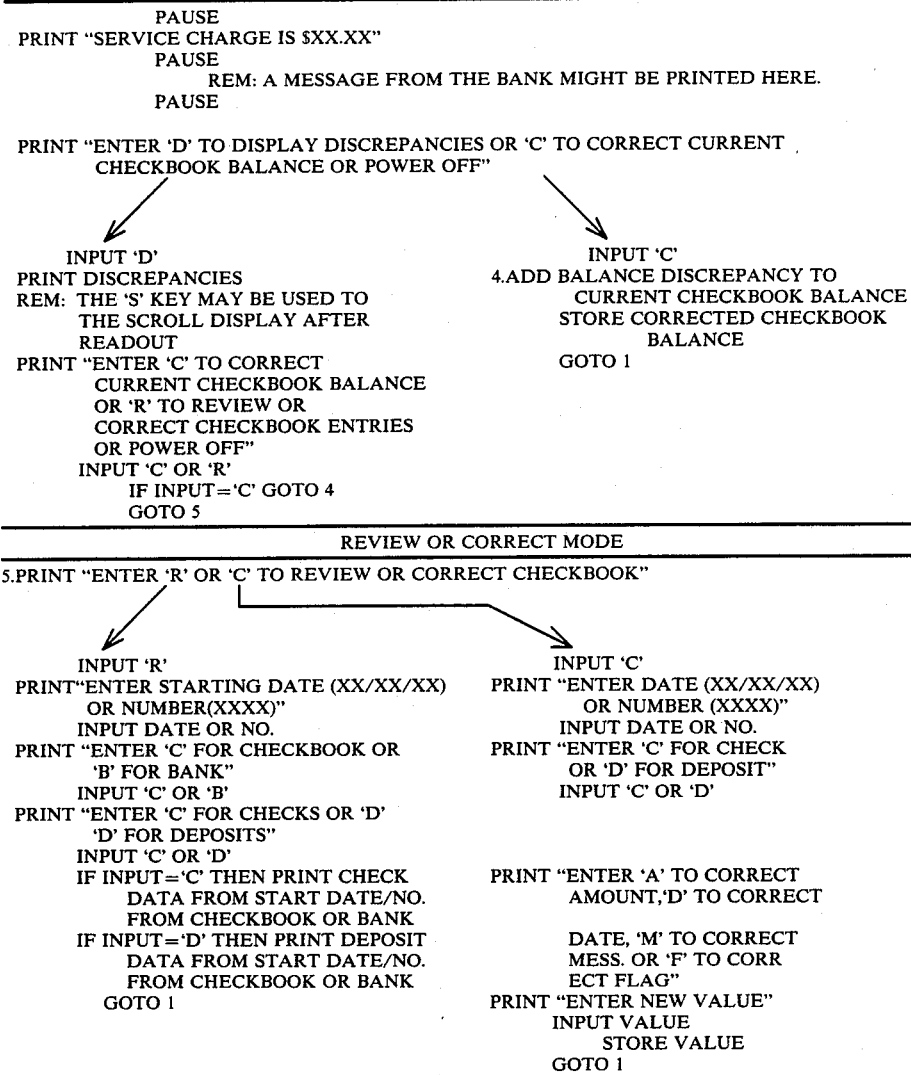

While a preferred embodiment of the invention has been shown and described, it will be apparent to those skilled in the art that changes can be made in this embodiment without departing from the principles and spirit of the invention, the scope of which is defined in the appended claims. For example, the "check stub" data may be recorded on magnetic cards by the hand-held calculator, and the cards may be transported to the responsible financial institution, as by mailing the card to a bank office or carrying the card to an automatic teller machine, at which the card is read and calculations performed electronically for checking account balancing and rectification.

I claim:

1. A method of maintaining financial records, which comprises:

providing a user with a hand-held calculator unit having data entry means, memory means, calculating means, and display means;

entering first data into said unit via said data entry means and storing said first data in said memory means, said first data concerning each of a plurality of financial transactions of the user and including first numeric data relating to checks written by the user on a checking account and deposits made by the user to the checking account;

calculating, via said calculating means, and storing in said memory means, a first running balance dependent upon the totality of said first numeric data;

providing second data, including second numeric data, concerning at least some of said financial transactions of the user, to a remote financial institution;

storing said second data on a machine-readable record at said financial institution and also providing and storing on said record a second running balance dependent upon the totality of the second numeric data provided to said financial institution;

transmitting said record from said financial institution to said user;

machine-reading said record into said unit;

electronically performing programmed data processing in said unit so as to produce outputs, said processing including comparing checks and deposits in said first data with checks and deposits, respectively, in said second data, comparing said first running balance with said second running balance, and determining and correcting any errors in said first running balance; and displaying at least some of said outputs on said display means.

2. A method in accordance with claim 1, wherein said record is produced by storing said second data and said second running balance magnetically on a card that is sent to said user, and wherein said second data and said second running balance stored magnetically on said card are read into said unit magnetically.

3. A method of maintaining financial records, which comprises:

providing a user with a hand-held calculator unit having data entry means, memory means, and calculating means;

entering first data into said unit via said data entry means and storing said first data in said memory means, said first data concerning each of a plurality of financial transactions of the user and including first numeric data relating to checks written by the user on a checking account and deposits made by the user to the checking account;

calculating, via said calculating means, and storing in said memory means, a first running balance dependent upon the totality of said first numeric data;

producing with said unit a machine-readable record of said first data and said first running balance;

providing second data, including second numeric data, concerning at least some of said financial transactions of the user, to a remote financial institution;

storing said second data at said financial institution and also producing and storing at said financial institution a second running balance dependent upon the totality of the second numeric data provided to said financial institution;

transporting said record to said financial institution;

machine-reading the transported record at said financial institution;

electronically performing programmed data processing at said financial institution so as to produce outputs, said processing including comparing checks and deposits in said first data with checks and deposits, respectively, in said second data, comparing said first running balance with said second running balance, and determining and correcting any errors in said first running balance; and displaying at least some of said outputs.

4. A method in accordance with claim 3, wherein said record is produced by storing said first data and said first running balance magnetically on a card that is transported to said financial institution, and wherein said first data and said first running balance stored magnetically on said card are read magnetically at said financial institution.

* * * * *